US012688497B1

(12) United States Patent　　　　(10) Patent No.:　US 12,688,497 B1
Mitchnick et al.　　　　　　　　　　(45) Date of Patent:　　Jul. 21, 2026

(54) SYSTEM AND METHOD FOR USING DATA IN DIGITIZED BLOCKS IN A BLOCKCHAIN AS COLLATERAL

(71) Applicant: BLACKROCK FINANCE, INC., New York, NY (US)

(72) Inventors: Robert Mitchnick, New York, NY (US); Jonathan Steel, New York, NY (US)

(73) Assignee: BlackRock Finance, Inc., New York, NY (US)

( * ) Notice: Subject to any disclaimer, the term of this patent is extended or adjusted under 35 U.S.C. 154(b) by 292 days.

(21) Appl. No.: 17/712,707

(22) Filed: Apr. 4, 2022

Related U.S. Application Data

(60) Provisional application No. 63/172,470, filed on Apr. 8, 2021.

(51) Int. Cl.
　　*G06Q 20/36*　　　(2012.01)
　　*G06Q 40/06*　　　(2012.01)
(52) U.S. Cl.
　　CPC ..... *G06Q 20/3672* (2013.01); *G06Q 20/3678* (2013.01); *G06Q 40/06* (2013.01); *G06Q 2220/00* (2013.01)
(58) Field of Classification Search
　　None
　　See application file for complete search history.

(56)　　　　　　References Cited

U.S. PATENT DOCUMENTS

| 11,308,487 | B1 * | 4/2022 | Foster | ................ | G06Q 20/3829 |
| 11,727,401 | B1 * | 8/2023 | Winklevoss | .............. | H04L 9/50 |
| | | | | | 705/50 |
| 11,909,860 | B1 * | 2/2024 | So | ........................ | G06Q 20/401 |
| 2016/0321752 | A1 * | 11/2016 | Tabacco | ............. | G06Q 20/3674 |
| 2017/0109744 | A1 * | 4/2017 | Wilkins | ................ | H04L 9/3236 |
| 2020/0394652 | A1 * | 12/2020 | Youb | ...................... | G06Q 50/16 |
| 2021/0110469 | A1 * | 4/2021 | Ross | ................... | G06F 21/6218 |
| 2022/0180331 | A1 * | 6/2022 | Lobban | .................. | G06Q 20/10 |
| 2022/0351286 | A1 * | 11/2022 | Sliwka | ................. | H04L 9/0894 |
| 2024/0135363 | A1 * | 4/2024 | Donald | ............. | G06Q 20/3678 |

* cited by examiner

*Primary Examiner* — Chrystina E Zelaskiewicz
(74) *Attorney, Agent, or Firm* — Haynes and Boone, LLP

(57)　　　　　　ABSTRACT

Shares in a fund, such as a money market fund ("MMF"), may be created in a digitized format using distributed ledger technology ("DLT"). The digitized shares correspond to physical shares of the MMF that may be obtained at an exchange. The digitized shares may be stored in a distributed ledger, such as a blockchain. The DLT provides for instantaneous transfer of the digitized shares using digital signatures. The digitized shares may be used as collateral, such that a first entity maintains ownership of physical shares in the MMF while transferring control of the digitized shares in the distributed ledger to a second entity.

18 Claims, 5 Drawing Sheets

<u>400</u>

Storing digitized shares of a digitized money market fund on a distributed ledger comprising multiple tokens — 402

Exchanging one or more digital shares of the digitized money market fund — 404

Tracking the exchange of the one or more shares in the one or more tokens of the distributed ledger — 406

SYSTEM AND METHOD FOR USING DATA IN DIGITIZED BLOCKS IN A BLOCKCHAIN AS COLLATERAL

RELATED APPLICATION

This application claims priority to U.S. Provisional Application No. 63/172,470 filed Apr. 8, 2021, which is incorporated herein by reference in its entirety.

TECHNICAL FIELD

The embodiments are directed to blockchain technology, and more specifically to using digitized shares stored in a distributed ledger, such as a blockchain, as collateral.

BACKGROUND

As blockchain technology evolved and gained adoption within finance, the trend of "tokenizing" financial assets has gained momentum. In particular, tokenized cash, also referred to as "stable coins," has become an area of considerable development work by private institutions, consortia, and central banks. Tokenization involves issuing an asset over a blockchain, which may be a distributed ledger, where ownership of that asset is recorded, traded, and settled over the ledger with no central administrator or record-keeper. For assets without physical manifestation, such as equities or funds, the asset becomes entirely digitally native. For assets with a physical manifestation, such as real estate or commodities, the token instead becomes a digitally native ownership record. Tokenized assets can be issued on either a public or private blockchain. On a public blockchain, ownership records are visible pseudonymously and participation is open. On a private blockchain, ownership records are private and both network security and participation are limited to trusted entities.

Figure 1:
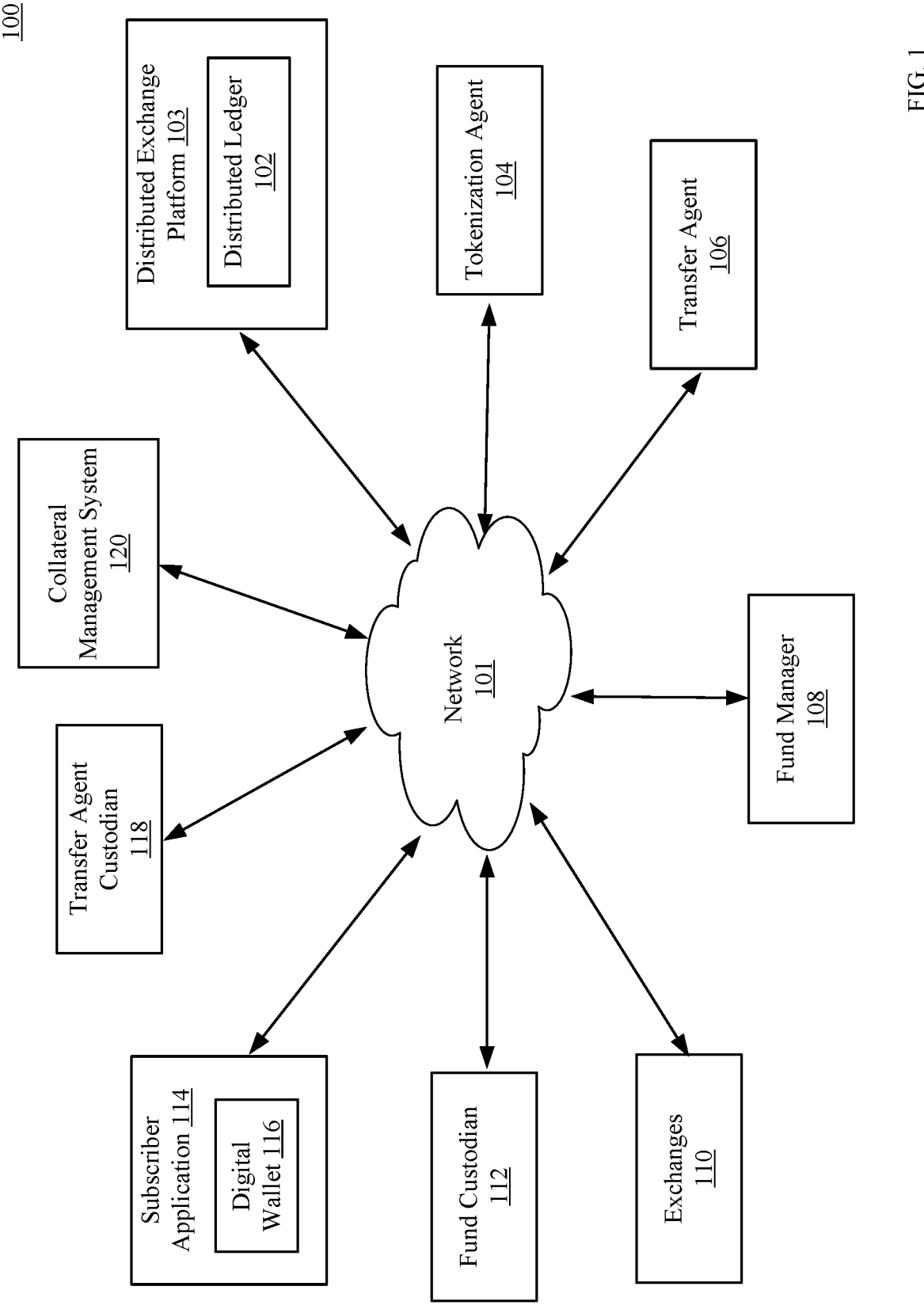
FIG. 1 is a diagram of a computing environment where various embodiments may be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A money market fund ("MMF") may be created by a fund custodian. Once created, the shares may be traded on various exchanges on behalf of investors. The MMF that is created by a fund custodian is referred to as a physical MMF and shares of the physical MMF traded on various exchanges are referred to as physical shares. Physical shares of the MMF may also be in a digitized format and created using distributed ledger technology ("DLT"), such as a blockchain technology. In the DLT, digitized shares of the MMF may be stored on a distributed ledger as tokens. The MMF that is stored on the distributed ledger as tokens is referred to as a digitized MMF.

Ownership of digitized shares may be tracked using a digital wallet signature of the owner of the tokens. The digital wallet signature may be obtained by a party registering with digital wallet software. Once registered, the digital wallet software may provide the party with a unique digital wallet signature. The digitized MMF may leverage the unique properties of DLT-native digital assets. These properties include having digitized shares be instantaneously transferable, globally interoperable, and programmable. In some embodiments, a digitized MMF may function as a "stable coin" and may unlock numerous benefits. Those benefits include using digitized shares of the MMF as collateral, enhancing liquidity of the MMF, providing operating efficiency gains, and making the digitized MMF applicable in trade settlement and payment processes.

In some embodiments, digitized shares of a digitized MMF may be used as collateral. Conventionally, physical MMFs may be used in collateral transactions in a very limited context. This is because physical MMFs are not a transferable security. However, because digitized MMFs may be transferable by transferring ownership of tokens in the distributed ledger, the digitized MMF may be used as collateral where ownership of the digitized shares may be transferred between parties.

Using the digitized MMF as collateral may provide various benefits. The digitized MMF may be a stable source of new assets under management ("AUM"). The digitized MMF may have a virtuous circle of enhanced collateral utility driving enhanced adoption. The digitized MMF may remove liquidation pressures during times of market stress because the digitized shares of the digitized MMF are available in a frictionless, real-time transfer and do not need to be sold. Further, because the digitized MMF may be stored in the distributed ledger, such as a blockchain, the digitized MMF reduces reconciliation challenges that are prevalent in reconciling physical MMFs.

Transferring ownership of digitized shares in a digitized MMF involves migration of ownership records from a traditional transfer agent database to a distributed ledger. Under this structure, fund shares of the digitized MMF may be issued, settled, and recorded directly on the distributed ledger. Unlike an interest in shares of a conventional physical MMF that is being held in entries of a recorded ledger siloed in a system of the MMF's transfer agent, the interest in shares in a digitized MMF may be recorded as a cryptographic ledger entry on a distributed ledger. Once recorded on the distributed ledger, the interest in share in the digitized MMF may be visible to permissioned parties and also transferable directly between network participants that have access to the distributed ledger.

FIG. 1 is a block diagram of a computing system 100 where various embodiments may be implemented. The computing system 100 in FIG. 1 may have various computing devices and applications that are communicatively connected together over a network 101. In a non-limiting embodiment, network 101 may be a local area network, wide area network, including the Internet, or another type of a network.

In some embodiments, the system 100 in FIG. 1 may include a distributed ledger 102. Distributed ledger 102 may be a blockchain or another cryptographic list of records in some embodiments and may be created using distributed ledger technology. Distributed ledger 102 may store digitized shares of a digitized money market fund (MMF). For example, each block or token in distributed ledger 102 may include one or more digitized shares of the digitized MMF and/or a record of ownership of the one or more digitized shares. Each block may also include attribute data that is associated with the one or more shares. Example data may be a type of security or another financial instrument associated with the share, rules for transferring the share, interest rate, etc. Notably different types of attribute data may be associated with different types of digitized shares of one digitized MMF. In some instances, there may be one distributed ledger 102 for each digitized MMF, such that tokens in the distributed ledger 102 correspond to shares the digitized MMF. In other instances, there may be one distributed ledger 102 for multiple digitized MMFs, such that tokens in the distributed ledger 102 correspond to shares of multiple digitized MMFs.

As discussed above, distributed ledger 102 may be implemented using a blockchain. A blockchain may comprise a plurality of blocks. Each block may comprise a record of one or a plurality of submitted and validated transactions. The blocks of the blockchain may be linked together and cryptographically secured. In some cases, the post-quantum cryptographic algorithms that dynamically vary over time may be utilized to mitigate ability of quantum computing to break present cryptographic schemes, such as secure hashing algorithms.

In some embodiments, distributed ledger 102 may be "decentralized," such that distributed ledger 102 may be stored among various participants connected by network 101. Because of this, the accuracy and integrity of distributed ledger 102 cannot be attacked at a single, central location.

In some embodiments, tokens may refer to an entry or block in the blockchain that belongs to a blockchain address. The entry may comprise information associated with an asset and indicating ownership of the asset. An example asset may be a digitized share in the digitized MMF that is stored in a distributed ledger 102. In this case, the digitized share is a token and the distributed ledger 102 is the blockchain. A person who owns the private key or a digital wallet signature corresponding to the blockchain address may access the token at the address. The token may be accessible to the owner via the owner's digital wallet associated with the digital wallet signature. The owner of a token may send or transfer the token to another user, e.g., a recipient user, via a blockchain transaction. For example, the owner may sign the transaction corresponding to the transfer of the token with a wallet signature. When the token is received by the digital wallet of the recipient user, the token may be recorded in the blockchain at the blockchain address of the recipient user, and the recipient user, represented on the blockchain by its blockchain address, may then be considered as the new owner of the token. By analogy, an owner who owns the digital wallet signature of a digitized share at a particular address in the distributed ledger 102, owns the digitized share. The owner may transfer the ownership of the digitized share by signing a transaction with the owner's digital wallet signature that transfers the ownership of the digitized share to a recipient user, such that the digitized share is now associated with the digital wallet signature of the recipient user.

In some embodiments, distributed ledger 102 may be accessible using a distributed exchange platform 103. Distributed exchange platform 103 may include multiple distributed ledgers, including distributed ledger 102. Distributed exchange platform 103 may include multiple computing devices, including devices discussed in FIG. 1. Distributed exchange platform 103 may receive instructions to generate and add a token to distributed ledger 102 using blockchain technology. In some embodiments, to access distributed exchange platform 103, various parties may authenticate and register with distributed exchange platform 103 using secure software that may authenticate the parties through the parties' digital wallets.

A tokenization agent 104 may be a computing device that issues tokens or instructs distributed exchange platform 103 to issue tokens that are stored in distributed ledger 102. There may be multiple tokenization agents 104 in the computing system shown in FIG. 1 (not shown). Tokenization agent 104 may be communicatively connected to distributed exchange platform 103 or be included within distributed exchange platform 103 (not shown). Tokenization agent 104 may facilitate in creating digitized shares for corresponding physical shares of the physical MMF. Tokenization agent 104 may also facilitate redemption and conversion of digitized shares of the digitized MMF stored in distributed ledger 102.

Transfer agent 106 may be a computing system that communicates with tokenization agent 104. Transfer agent 106 may store records of the physical shares of the physical MMF in a share record ledger. In some embodiments, transfer agent 106 may also reconcile physical shares of the physical MMF with digitized shares of the digitized MMF stored in distributed ledger 102.

Fund manager 108 may be a computing system that managers one or more physical funds, including the physical MMF. To manage a physical MMF, fund manager 108 may buy and sell shares of the physical MMF using one or more exchanges 110. In some instances, fund manager 108 may receive one or more orders from an investor using a subscriber application described below. In response to receiving an order, fund manager 108 may buy or sell physical shares of the MMF on one or exchanges 110 as stipulated in the order. There may be multiple fund managers 108 in system 100 (not shown).

Fund custodian 112 may be a computing system for generating a physical MMF. Fund custodian 112 may generate a physical MMF according to one or more algorithms, strategies, etc., and determine one or more securities that may be included in the physical MMF. Fund custodian 112 may also determine proportions of the securities in the physical MMF relative to each other. In some embodiments, fund manager 108 may buy or sell shares of MMF by conducting transactions on exchange 110 with another fund manager 108 or with fund custodian 112.

An investor may place orders to buy or sell shares of a physical MMF using a subscriber application 114. Subscriber application 114 may be accessed, downloaded, or stored on one of computing devices that is communicatively connected to system 100. Typically, computing devices where subscriber application 114 may execute include a user desktop, a laptop, a smartphone or another user computing device. There may be multiple subscriber applications 114 in system 100. When subscriber application 114 receives an order to buy or sell shares of the physical MMF, subscriber application 114 may transmit the order to transfer agent 106. The order may then be passed to fund manager 108 to be traded on one or more exchanges 110 or with fund custodian 112.

In some embodiments, subscriber application 114 may include a digital wallet 116. Digital wallet 116 may be software and/or hardware based application that securely stores data of a user. A user may register with a digital wallet and upon registration be provided with a unique digital wallet signature that the user may use to conduct transactions, establish digital ownership, access distributed exchange platform 103, etc. In some embodiments, digital wallet 116 may track ownership of digitized shares in the digitized MMF that are stored as tokens in distributed ledger 102. To track ownership, digital wallet 116 may provide a digital wallet signature that may be used to sign tokens in distributed ledger 102 that include digitized shares owned by an investor. Alternatively, the digital wallet signature may be stored in a token of distributed ledger 102 as one of the share attributes and identify the investor as the owner of the digitized share.

Transfer agent custodian 118 may be a computing system that may provide digital wallets 116 to subscriber applications 114. Transfer agent custodian 118 may also manage access to digital wallets 116 by users, such as investors, which may be individuals, groups, or entities. For example, transfer agent custodian 118 may manage and store encryption keys that register the user with digital wallet 116 and authenticate the user to digital wallet 116. In some instances, transfer agent custodian 118 may store the users' public keys for digital wallet authentication while the subscriber application 114 securely stores the private key (or vice versa). Transfer agent custodian 118 may also access distributed ledger 102 as requested by subscriber application 114 to obtain information, including ownership information of one or more shares that are stored in distributed ledger 102 on behalf of the user.

In some embodiments, transfer agent custodian 118 may also receive orders from subscriber application 114 to purchase or sell physical shares of the MMF. As discussed above, these orders may be processed by transfer agent 106 and fund manager 108 on exchanges 110. In response to purchasing or selling physical shares of the physical MMF, transfer agent custodian 118 may also cause tokenization agent 104 to create a new token or modify ownership information of the existing token. For example, tokenization agent 104 may issue a new token that stores the digitized share on distributed ledger 102 when a new physical share of physical MMF is purchased on behalf of the user using exchange 110. The new digitized share may correspond to the purchased physical share, in some embodiments.

Figure 2:
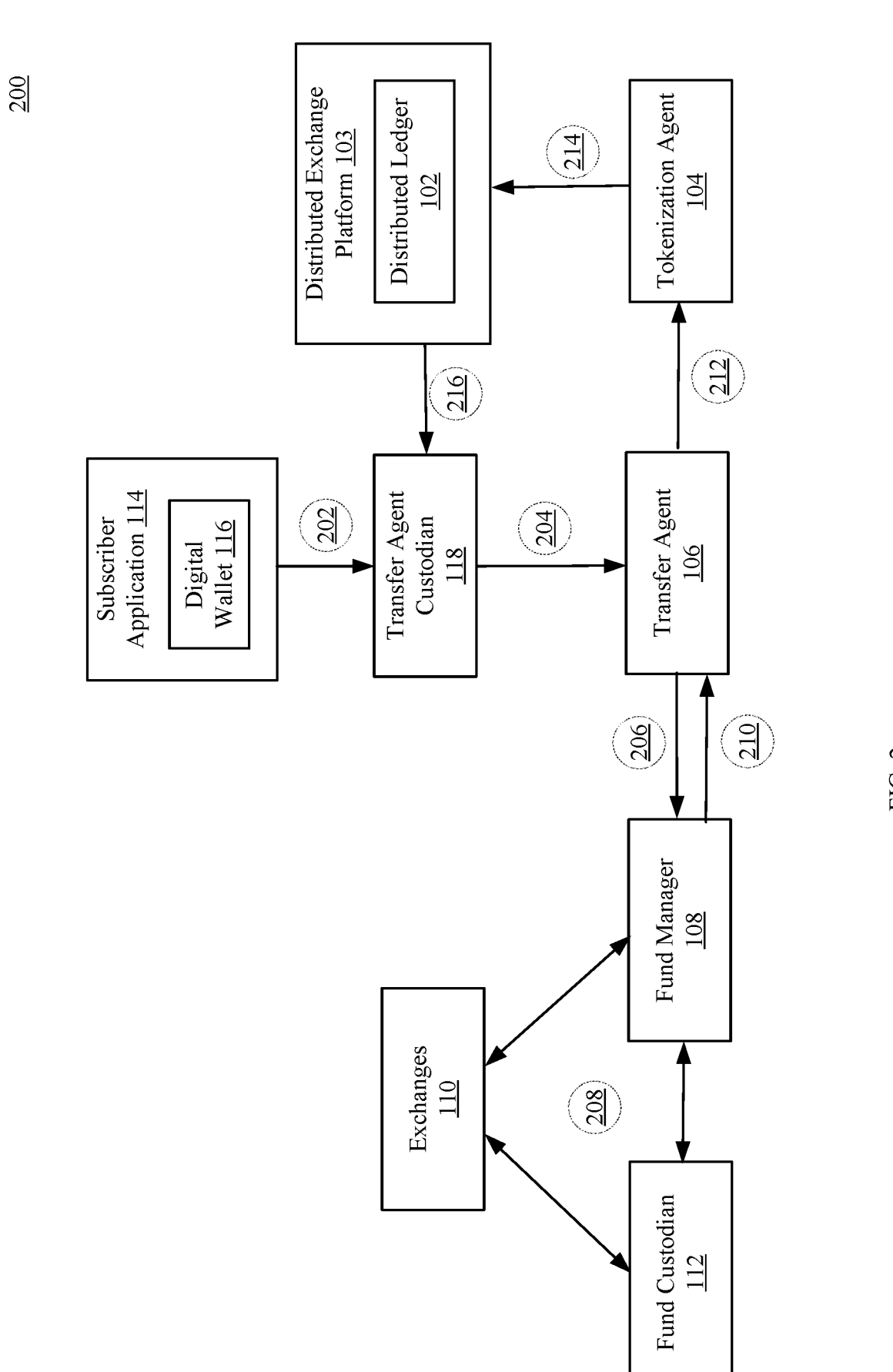
FIG. 2 is a block diagram of a computing environment illustrating a flow for issuance of a token stored on a distributed ledger, according to some embodiments.

FIG. 2 is a block diagram 200 illustrating a flow for issuance of a token to a distributed ledger, according to some embodiments. As discussed above, a token may represent a digitized share of a digitized MMF that has a corresponding physical share of a physical MMF. An issuance of a new token to distributed ledger 102 may correspond to a user purchasing a physical share of the MMF. For example, subscriber application 114 may receive instructions from a user to transfer money to purchase a physical share of a physical MMF. In response, a token that stores a new digitized share that corresponds to the purchased physical share is created on distributed ledger 102. The token may include an address or digital wallet signature of digital wallet 116 associated with the user using subscriber application 114. In this way, the token is associated with the digital wallet 116 and ultimately the user. Although discussed with a reference to a single share, and user may also purchase multiple shares which may cause multiple tokens to be issued and stored on distributed ledger 102.

As illustrated in more detail in FIG. 2, in step 202, subscriber application 114 may submit an order to purchase a physical share of a physical MMF to transfer agent custodian 118. Subscriber application 114 may also transfer cash or another monetary instrument for an amount specified in the order.

In step 204, transfer agent custodian 118 may transfer the order and the monetary instrument to transfer agent 106. In some embodiments, steps 202 and 204 may be combined with subscriber application 114 transferring the order and the monetary instrument to transfer agent 106.

In step 206, transfer agent 106 transfers the order and the monetary instrument to fund manager 108. In some instances, transfer agent 106 may instead transfer the order to fund custodian 112 (not shown).

In step 208, fund manager 108 or fund custodian 112 may process the order with each other or using one or more exchanges 110 to purchase physical shares of the physical MMF.

In step 210, transfer agent 106 may receive physical shares of MMF and store the record of the physical shares in a share record ledger. The share record ledger may be a database or another memory storage for storing ownership records of the physical shares. In some instances, the share record ledger that stores the records of the physical shares may also store a wallet signature of digital wallet 116 associated with the user's account in the subscriber application 114 that placed the order. The share record ledger may also store attributes of the physical share.

In step 212, transfer agent 106 may instruct tokenization agent 104 to issue a token that represents a digitized share of the physical share of the MMF. As discussed above, the token may include a representation of the physical share, attributes of the share, and a digital wallet signature of digital wallet 116 associated with the user's account in the subscriber application 114. Transfer agent 106 may pass the digital wallet signature of the digital wallet 116 for inclusion into the token. As discussed above, the digital wallet signature may be unique to a user and track the ownership of the user's one or more digitized shares in the distributed ledger 102.

In step 214, tokenization agent 104 may generate a token or causes distributed exchange platform 103 to generate a token that represents the digitized share and adds the token to distributed ledger 102. As discussed above, distributed ledger 102 may represent a digitized MMF and each token in distributed ledger 102 may correspond to a digitized share of the digitized MMF that has a counterpart physical share in a physical MMF.

In step 216, transfer agent custodian 118 may access distributed ledger 102 using the digital wallet signature of digital wallet 116 and retrieve information associated with the token. The information may be displayed within digital wallet 116 of a user, e.g., the owner of the physical share.

Going back to FIG. 1, in some embodiments, tokens storing digitized shares in distributed ledger 102 may be used as collateral between multiple parties. The parties may be different fund managers 108, fund custodians 112, or investors. Using tokens of the distributed ledger 102 as collateral may not alter the underlying holder of record of the physical shares in the physical MMF. For example, the holder of physical shares of the MMF would still be the user who purchased the physical shares. However, for the duration of the period the digitized shares are used as collateral, the owner of the digitized shares may change from the user who purchased the physical shares to the collateral holder.

In some embodiments, collateral pledges may mirror existing legal and regulatory structures. Like existing legal and regulatory structures, collateral pledges may involve transfer of ownership of shares. However, unlike existing legal and regulatory structures that require time for settlement processing, the transfer of tokens in the distributed ledger 102 is instantaneous. Also, like legal and regulatory structures, the transfer of ownership of tokens may constitute a transfer of control, that is a perfected security interest in the event of default, of the physical shares. However, unless there is a default, there may not be a change to the underlying owner of record in the record ledger of the transfer agent 106 of the physical shares. As a result, cash distributions, reporting, proxy voting and other ongoing processes may continue to be captured using current infrastructure and be provided to the holder of record, e.g., a user who purchased the physical shares.

The ability to rehypothecate, or use user's assets that the user has put up as collateral, may be instrumental for various institutions using distributed ledger 102. To use tokens of the distributed ledger 102 as collateral, system 100 may include a collateral management system 120. Computing devices of numerous institutions may connect to collateral management system 120. Collateral management system 120 may perform collateral trades on behalf of various users. Further, to obtain access to distributed ledger 102, collateral management system 120 may authenticate with distributed exchange platform 103.

In some embodiments, distributed exchange platform 103 may also onboard computing systems of various banks or other parties interested in collateral transactions using distributed ledger 102. Once onboarded, the computing systems may access the distributed exchange platform 103 to facilitate using the pledged tokens in distributed ledger 102 as collateral between various parties.

Figure 3:
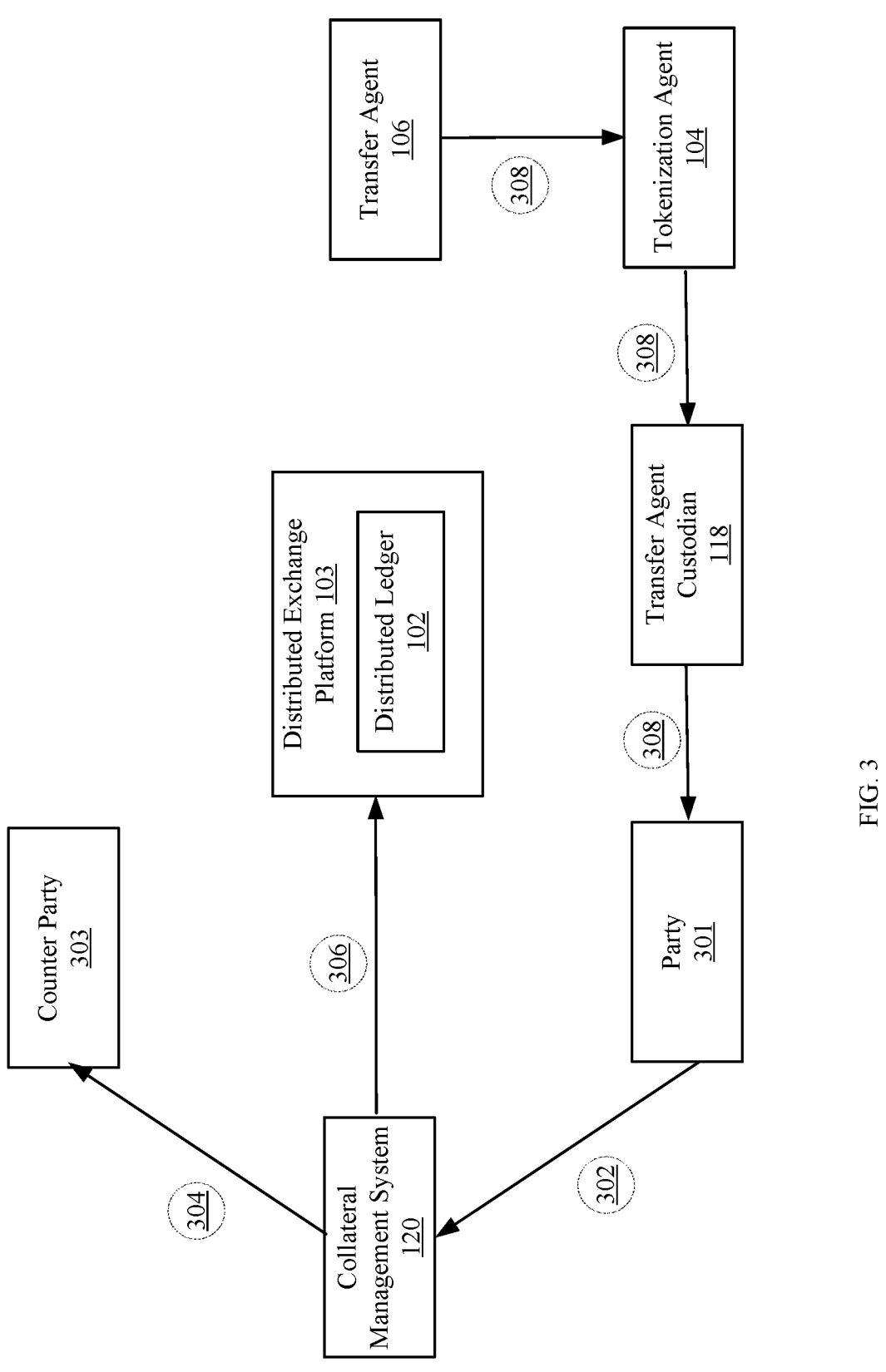
FIG. 3 is a block diagram of a computing environment illustrating a flow for using a token in a distributed ledger as collateral, according to some embodiments.

FIG. 3 is a block diagram 300 of a computing environment that illustrates a flow for using a token in a distributed ledger as collateral, according to some embodiments. In FIG. 3, a token that stores a digitized share in distributed ledger 102 may be used as collateral between party 301 and counter party 303. Both party 301 and counter party 303 may be fund managers 108 or other institutions that receive instructions from owners of the physical shares, such as investors using subscriber application 114. In some embodiments, party 301 and counter party 303 may use computing devices to exchange tokens as collateral. Computing devices of party 301 and counter party 303 may be authenticated with distributed exchange platform 103 and collateral management system 120. Party 301 may be or associated with a user who holds shares in distributed ledger 102 and also is an owner of the physical shares. Party 301 may pledge the digital shares as collateral to counter party 303 on behalf of the user, while the counter party 303 may provide party 301 with funds. Although shown as a single party 301 and counter party 303, there may be multiple parties 301 and counter parties 303 that may use digitized shares in distributed ledger 102 as collateral.

To use digitized shares as collateral, in step 302, party 301 and counter party 303 connect to collateral management system 120. Collateral management system 120 indicates for the computing device of party 301 to post margin. Margin may be an amount of money that party 301 may borrow in response to putting digitized shares in distributed ledger 102 as collateral.

In step 304, collateral management system 120 or another trading system accessible to the computing devices of party 301 and counter party 303 may execute a collateral trade. The collateral trade may indicate digital shares that may be used as collateral.

In step 306, collateral management system 120 may cause the distributed exchange platform 103 to transfer ownership of digital shares in distributed ledger 102 that were involved in the collateral trade from party 301 to counter party 303. In some embodiments, collateral management system 120 may receive digital wallet signatures of digital wallets 116 associated with party 301 and counter party 303 (or the respective users) and update the wallet signatures of tokens with digital shares that are subject to collateral trade with the wallet signature of counter party 303. Because collateral management system 120 may cause distributed exchange platform 103 to update the wallet signature associated with party 301 with the wallet signature of counter party 303 as the collateral trade in step 304 occurs, party 301 may pledge the digitized shares in the tokens to counter party 303 in real time. In this way, party 301 may pledge the digitized shares in distributed ledger 102 as collateral to counter party 303 and avoid or minimize the conventional settlement process which may take several days. Notably, even though the ownership of digitized shares in the distributed ledger 102 is transferred from party 301 to counter party 303, the record ledger of the physical shares maintained by transfer agent 106 or transfer agent custodian 118 still indicates that the physical shares of the physical MMF belong to party 301 or the associated investor.

In some embodiments, tokenization agent 104 may store a record of tokens that have been used as collateral by various parties 301. The parties 301 and the record of tokens that are being used as collateral may be fully disclosed and accessible within the system shown in FIG. 2.

In step 308, an interest for the shares is paid to party 301. For example, regardless of the pledge, when interest from the physical shares is paid by the fund custodian 112, the interest is paid to the holder of record for the physical shares, e.g., the user who purchased the shares. That is, the fund custodian 112 may pay the interest for the shares to the transfer agent 106, which in turn transfers the interest to the tokenization agent 104. From the tokenization agent 104 the interest may be transferred to the transfer agent custodian 118. From the transfer agent custodian 118 the interest may be transferred to the user or investor via subscriber application 114, who may be party 301.

A default may occur when party 301 is unable to provide funds back to counter party 303. In the event of default (not shown), the collateral holder, e.g., counter party 303, may not become a shareholder of shares in the distributed ledger 102. Rather, a default notice may be provided to the transfer agent 106 of party 301 by transfer agent 106 of counter party 303. The transfer agent custodian 118 of counter party 303 (e.g., the collateral holder) may then initiate a process of redeeming the physical shares through the transfer agent 106 of counter party 303. This results in the transfer agent 106 of party 301 selling the physical shares of the physical MMF on one or more exchanges 110 or to fund custodian 112. The transfer agent 106 of party 301 may then wire the monetary instrument from the sale of the physical shares to the transfer agent 106 of counter party 303, which then passes the monetary instrument to the transfer agent custodian 118 of counter party 303. The collateral holder may then receive the monetary instrument through subscriber application 114.

Figure 4:
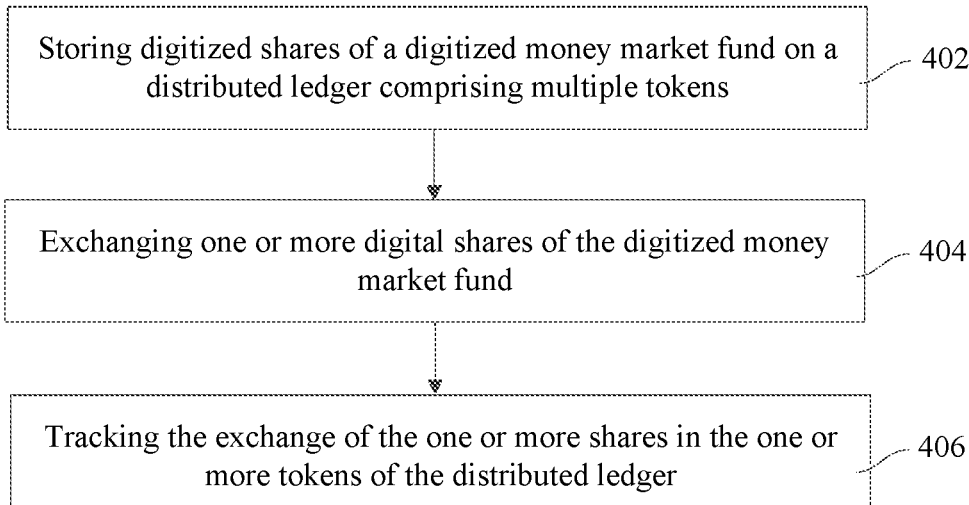
FIG. 4 is a flowchart of a method for tracking ownership of tokens in a distributed ledger, according to some embodiments.

FIG. 4 is a flowchart of a method 400 for tracking ownership of tokens in a distributed ledger, according to some embodiments. Method 400 may be performed using hardware and/or software components described in FIGS. 1-3 and 5. Note that one or more of the operations may be deleted, combined, or performed in a different order as appropriate.

At operation 402, digitized shares of a digitized MMF are stored on a distributed ledger. For example, tokenization agent 104 may create and store one or more digitized shares in one or more tokens on distributed ledger 102. As discussed above, tokenization agent 104 may issue a token that stores a digitized share in response to a user purchasing a physical share of a physical MMF on one of exchanges 110. While transfer agent 106 may store a record of ownership for a physical share in a share record ledger, distributed ledger 102 may store a digitized share that corresponds to a physical share of the physical MMF. As discussed above, each digitalized share may include attributes of the physical share and a digital wallet signature of digital wallet 116 that is associated with the owner or user who purchased the physical share of the physical MMF. In some embodiments, operation 402 may repeat multiple times using multiple tokenization agents 104 that are issuing different digitized shares that correspond to physical shares of the physical MMF for various users.

At operation 404, one or more digitized shares are exchanged. As discussed above, one or more digitized shares stored as tokens on distributed ledger 102 may be exchanged. In one instance, digitized shares may be exchanged when party 301 uses the digitized shares as collateral to obtain funds from counter party 303. In this case, collateral management system 120 may perform a collateral trade and cause distributed exchange platform 103 to exchange digitized shares associated with party 301 with counter party 303. As discussed above, while the digitized shares may be exchanged, the physical shares of the physical MMF are not exchanged and transfer agent 106 maintains the record that indicates that party 301 remains an owner of the physical shares.

At operation 406, the exchange of one or more shares is tracked. For example, distributed ledger 102 may identify the one or more shares that were exchanged in operation 404 and record a digital wallet signature of the counter party 303 on the one or more tokens associated with the digitized shares.

There may be numerous benefits to storing digitized shares on distributed ledger 102. In some embodiments, the cash and securities held by the physical MMF may exist in primarily tokenized format as digitized shares. This makes the settlement process for issuance and redemption of shares to be programmed to settle on delivery versus payment ("DVP") and on instantaneous basis.

Distributed ledger 102 may be extended to also maintain ownership records. In this embodiment, distributed ledger 102 may maintain the share record ledger. In this way, the share record ledger of the physical shares that is stored by transfer agent 106 may be reconciled with distributed ledger 102.

There may also be benefits to tokenizing an MMF so that the digitized shares stored as tokens may be used as collateral. With respect to the collateral operations, the benefits may include frictionless, real-time transfer of tokens, global interoperability, removal of reconciliation challenges, virtuous circle of enhanced collateral utility driving enhanced adoption and AUM, and the removal of liquidation pressures during times of market stress.

With respect to the frictionless, real-time transfer, the distributed ledger 102 enables instantaneous transfer and settlement of tokens with full transparency into transaction status. Settlement of collateral could therefore be effected on a delivery versus payment ("DvP"), delivery versus delivery ("DvD"), or payment ("P") basis in a riskless, atomic manner. This may also eliminate counter party settlement risk. Further, the secondary market trading windows may be expanded to being twenty-four hours and seven days a week.

With respect to the global interoperability, the distributed ledger 102 may be accessed and utilized globally. In some embodiments, the distributed ledger 102 may be subject to regulatory constraints.

With respect to the removal of reconciliation challenges, distributed ledger 102 may allow the participants to have a common view of trade and settlement status of the tokens. This may be accomplished using subscriber application 114 that may access and retrieve token information from distributed ledger 102 that is associated with the digital signature(s) of the user and/or collateral holder. This is unlike conventional systems where operational inefficiencies arise from the lack of a common data record shared across ecosystem participants. The result is the perpetual need for reconciliation between the various parties.

With respect to the virtuous circle of enhanced collateral utility driving enhanced adoption and AUM, enhancing the utility of MMFs as a collateral instrument may induce enhanced adoption, which would in turn create greater utility as collateral by broadening the universe of market participants who would be willing to accept MMFs as collateral. This would ultimately drive a meaningful new source of stable AUM. Based on the current collateral pool that is greater than three trillion dollars held across uncleared initial margin ("IM"), uncleared variable margin ("VM"), cleared initial margin, and non-cash U.S. securities lending. An estimated share of the digitized MMF that is captured by one entity may be approximately ninety billion dollars by 2025 and approximately three hundred and fifty billion dollars by 2030.

With respect to the removal of liquidation pressures during times of market stress, the perceived risks associated with MMFs arise from the fact that in times of extreme market stress, investors may be forced to sell shares of the MMF in order to raise cash to post as collateral. If instead, digitized shares of the MMFs could be posted directly as collateral, this would obviate the need to liquidate, and in effect would eradicate the systemic risk present within the current MMF model.

Figure 5:
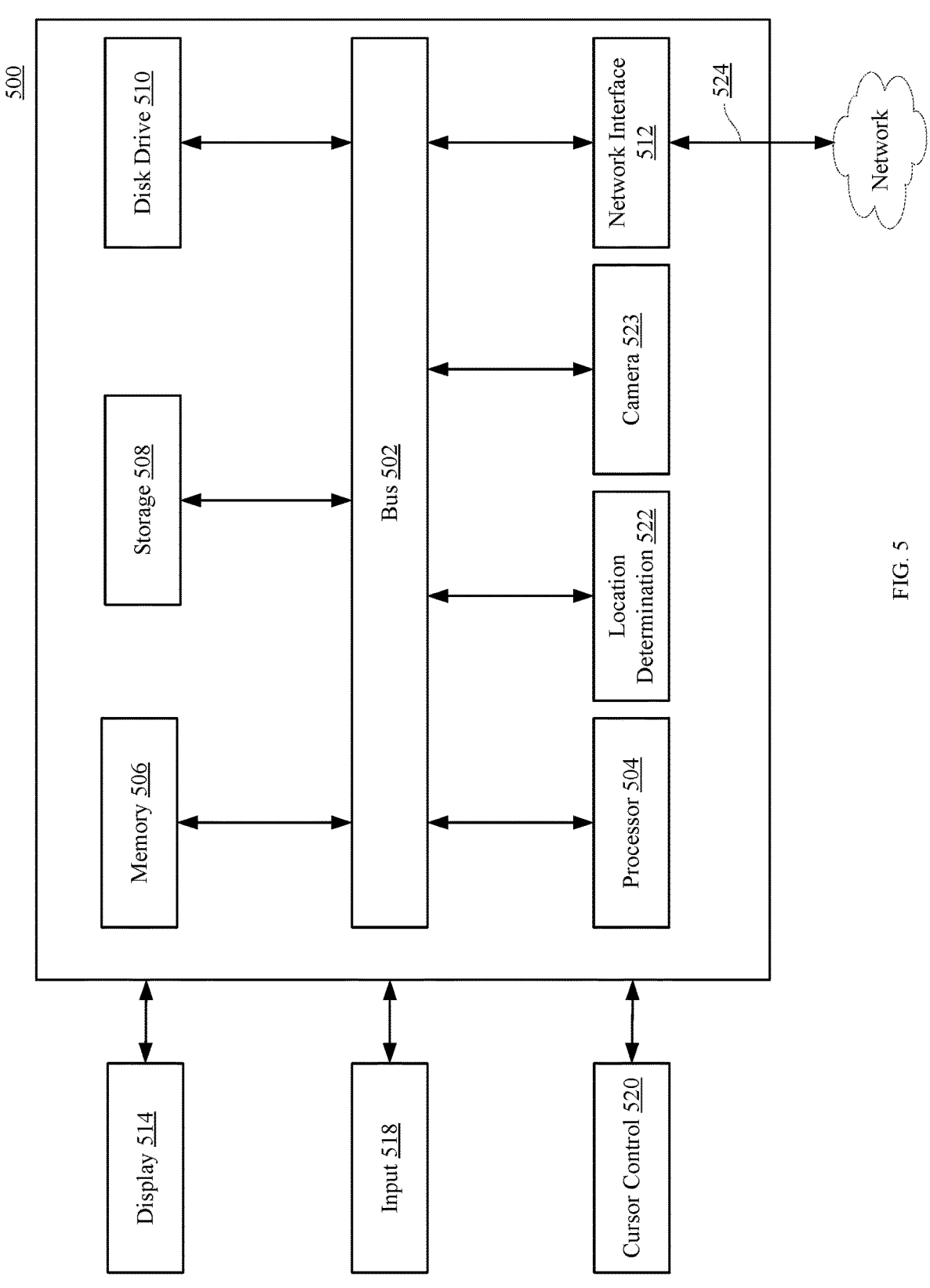
FIG. 5 is a block diagram of a computer system suitable for implementing one or more components or operations in FIGS. 1-4, according to an embodiment.

Referring now to FIG. 5 an embodiment of a computer system 500 suitable for implementing, the systems and methods described in FIGS. 1-4 is illustrated.

In accordance with various embodiments of the disclosure, computer system 500, such as a computer and/or a server, includes a bus 502 or other communication mechanism for communicating information, which interconnects subsystems and components, such as a processing component 504 (e.g., processor, micro-controller, digital signal processor (DSP), graphics processing unit (GPU), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), a location determination component 522 (e.g., a Global Positioning System (GPS) device as illustrated, a cell tower triangulation device, and/or a variety of other location determination devices known in the art), and/or a camera component 523. In one implementation, the disk drive component 510 may comprise a database having one or more disk drive components.

In accordance with embodiments of the disclosure, the computer system 500 performs specific operations by the processing component 504 executing one or more sequences of instructions contained in the memory component 506, such as described herein with respect to the mobile communications devices, mobile devices, and/or servers. Such instructions may be read into the system memory component 506 from another computer readable medium, such as the static storage component 508 or the disk drive component 510. In other embodiments, hard-wired circuitry may be used in place of or in combination with software instructions to implement the disclosure.

Logic may be encoded in a computer readable medium, which may refer to any medium that participates in providing instructions to the processing component 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 500. In various other embodiments of the disclosure, a plurality of the computer systems 500 coupled by a communication link 524 to a network, such as network 101 of FIG. 1, which may include a LAN, WLAN, PTSN, and/or various other wired or wireless networks, including telecommunications, mobile, and cellular phone networks, may perform instruction sequences to practice the disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. For example, while the above embodiments are described in relation to MMFs and using digitized MMFs as collateral, other funds or holding instruments may be suitable as well. Thus, the disclosure is limited only by the claims.

What is claimed is:

1. A system, comprising:

one or more memories storing instructions; and one or more hardware processors coupled to the one or more memories and executing the instructions to perform operations, the operations comprising:

storing, using at least one processor, a digitized fund comprising a plurality of digitized shares in a distributed ledger comprising a plurality of tokens, wherein each digitized share in the plurality of digitized shares has a corresponding physical share in a plurality of physical shares of a physical fund, and wherein the plurality of tokens store information associated with the plurality of digitized shares and the plurality of tokens are signed using digital wallet signatures corresponding to owners of the plurality of digitized shares;

storing, in a share record ledger in a memory storage, records associated with the plurality of physical shares and corresponding owners of the plurality of physical shares, wherein the share record ledger is separate from the distributed ledger;

exchanging, digitized shares using tokens in the distributed ledger, wherein the digitized shares and corresponding physical shares of the physical fund are owned by a first party and the digitized shares are exchanged as collateral with a second party while the physical shares remain with the first party, wherein the exchange further comprises:

accessing, from the distributed ledger, the tokens signed using a first digital wallet signature associated with a first digital wallet of the first party; and signing the tokens using a second digital wallet signature associated with a second digital wallet of the second party, wherein the exchange of the digitized shares is instantaneous after the signing of the tokens;

maintaining, in the share record ledger a record of the physical shares that are associated with the first party after the exchange of the corresponding digitized shares with the second party; and storing, in the share record ledger, the second digital wallet signature associated with the record of the physical shares.

2. The system of claim 1, further comprising:

receiving a new token, wherein the new token corresponds to a new digitized share of the digitized fund and wherein the new digitized share corresponds to a physical share of the physical fund.

3. The system of claim 2, further comprising:

generating the new token in response to executing an order for purchasing the physical share of the physical fund.

4. The system of claim 1, further comprising:

receiving instructions from a collateral management exchange for transferring ownership of the digitized shares of the digitized fund from the first party to the second party, wherein the instructions identify the digitized shares, the first digital wallet signature, and the second digital wallet signature associated with the second party.

5. The system of claim 1, wherein the distributed ledger is a blockchain.

6. The system of claim 1, wherein one digitized share corresponds to one token in the distributed ledger.

7. A system, comprising:

one or more memories storing instructions; and one or more hardware processors coupled to the one or more memories and executing the instructions to perform operations, the operations comprising:

purchasing physical shares of a money market fund on behalf of a first party;

recording ownership of the physical shares of the money market fund by the first party in a share record ledger stored in a memory storage;

generating digitized shares that correspond to the physical shares of the money market fund, wherein the digitized shares comprise attributes of the physical shares and a first digital wallet signature associated with a first digital wallet of the first party owning the physical shares;

storing the digitized shares as tokens in a distributed ledger, wherein the tokens are signed using the first digital wallet signature;

designating the digitized shares as a collateral to a second party; and transferring ownership of the digitized shares from the first party to the second party by signing the tokens in the distributed ledger with a second digital wallet signature associated with a digital wallet of the second party, while maintaining the ownership of the physical shares in the share record ledger in the memory storage as being associated with the first party after the transferring ownership of the digitized shares to the second party, wherein the transfer of ownership of the digitized shares is instantaneous after the signing of the tokens, and wherein the share record ledger is separate from the distributed ledger; and storing, in the share record ledger, the second digital wallet signature associated with the digital wallet of the second party with the physical shares.

8. The system of claim 7, wherein transferring the ownership of the digitized shares in the distributed ledger from the first party to the second party occurs in response to the designating the digitized shares as the collateral.

9. The system of claim 7, wherein a record of ownership of the physical shares remains the same irrespective of transfer of ownership of the corresponding digitized shares.

10. The system of claim 7, wherein the one or more hardware processors are further executing instructions comprising:

receiving an indication from a collateral management exchange for transferring ownership of the digitized shares to the second party, wherein the indication includes data associated with the digitized shares, the first digital wallet signature, and the second digital wallet signature associated with the second party; and identifying the digitized shares in the distributed ledger using the first digital wallet signature.

11. The system of claim 7, wherein the distributed ledger is a blockchain.

12. A method, comprising:

purchasing, using a processor, physical shares of a money market fund, the money market fund including a plurality of different securities and the physical shares including a portion of the plurality of the different securities;

generating digitized shares corresponding to the physical shares of the money market fund, wherein the digitized shares comprise attributes of the physical shares;

storing the digitized shares and a digital signature associated with an owner of the physical shares in tokens stored in a blockchain;

storing a record of ownership of the physical shares by the owner in a share record ledger in a memory storage of a computing device, wherein the share record ledger is separate from the blockchain;

designating the digitized shares as collateral for an entity; and transferring ownership of the digitized shares that are stored in the tokens in the blockchain to the entity, while maintaining the record of ownership of the physical shares by the owner in the memory storage after the transferring, wherein the transferring further comprises:

accessing the token using the digital signature associated with the owner; and signing the tokens using a second digital signature associated with the entity, wherein transferring the ownership of the digitized shares in the blockchain to the entity occurs in real-time;

storing, in the share record ledger, the second digital wallet signature with the record of ownership associated with the physical shares.

13. The method of claim 12, further comprising:

receiving, at the blockchain, an indication with the digital signature, the second digital signature, and information corresponding to the digitized shares.

14. The method of claim 13, wherein the record of ownership of the physical shares is associated with the owner irrespective of the transfer of ownership of the digitized shares using the blockchain to the entity holding the digitized shares as collateral.

15. The system of claim 3, further comprising:

signing the new token with a digital wallet signature corresponding to a third party associated with the purchasing of the physical share; and recording in the record the physical share and the third party.

16. The system of claim 3, wherein the new token is generated at a computing device separated from devices that store the plurality of tokens on the distributed ledger.

17. The system of claim 3, further comprising:

executing a subscriber application on a computing device, the subscriber application generating the order to purchase the physical share of the physical fund and store a digital wallet with at least one digital wallet signature.

18. The system of claim 1, further comprising:

signing the plurality of tokens using the digital wallet signatures corresponding to the owners of the plurality of digitized shares.

\* \* \* \* \*